United States Patent
Nakamura et al.

(10) Patent No.: US 7,783,902 B2
(45) Date of Patent: Aug. 24, 2010

(54) SAFETY CONTROLLER AND INPUT-OUTPUT UNIT THEREFOR

(75) Inventors: Toshiyuki Nakamura, Ritto (JP); Keiichi Teranishi, Numazu (JP)

(73) Assignee: OMRON Corporation, Kyoto (JP)

( * ) Notice: Subject to any disclaimer, the term of this patent is extended or adjusted under 35 U.S.C. 154(b) by 708 days.

(21) Appl. No.: 11/804,553

(22) Filed: May 17, 2007

(65) Prior Publication Data

US 2007/0285950 A1    Dec. 13, 2007

(30) Foreign Application Priority Data

May 19, 2006   (JP)   ............... 2006-139784

(51) Int. Cl.
G06F 1/26   (2006.01)
(52) U.S. Cl. ...................... 713/300; 713/340
(58) Field of Classification Search .................. 713/300, 713/310, 340
See application file for complete search history.

(56) References Cited

U.S. PATENT DOCUMENTS

| | | | |
|---|---|---|---|
| 6,122,686 A | | 9/2000 | Barthel et al. |
| 6,275,881 B1 | | 8/2001 | Doege et al. |
| 6,550,018 B1 | | 4/2003 | Abonamah et al. |
| 6,946,640 B1 | * | 9/2005 | Kawamura ............... 250/214 R |
| 2002/0095574 A1 | * | 7/2002 | Kori ............................ 713/170 |
| 2002/0172218 A1 | * | 11/2002 | Harrison ..................... 370/449 |
| 2003/0117829 A1 | * | 6/2003 | Ronza et al. .................. 365/96 |
| 2004/0239413 A1 | | 12/2004 | Gubbins |

FOREIGN PATENT DOCUMENTS

| | | |
|---|---|---|
| EP | 1083468 | 3/2001 |
| GB | 2159987 | 12/1985 |
| GB | 2330667 | 4/1999 |

OTHER PUBLICATIONS

Walczak, T.A., "Emergency PLC controlled shutdown", Advances in instrumentation and control, Instrument Society of America, vol. 45, No. part 4, (1990), pp. 1711-1725.
EP patent application No. 07009959.3, Search Report mailed Nov. 30, 1990.
EP patent application No. 07009959.3, Search Report mailed Feb. 3, 2010.

* cited by examiner

*Primary Examiner*—Mark Connolly
*Assistant Examiner*—Paul B Yanchus, III
(74) *Attorney, Agent, or Firm*—Weaver Austin Villeneuve & Sampson LLP (57) ABSTRACT

A safety controller of building block type has an array of a plurality of IO units each including IO circuits and a single IO unifying unit connectable to these IO units. The IO unifying unit has an IO power-receiving terminal for receiving power from an external IO power source and an IO power distributing terminal for distributing the received power to the array of IO units after passing inside the IO unifying unit. The array of IO units includes distribution mains extending along the array and having a starting end connected to the IO power distributing terminal and distribution branch lines for supplying power to each of the IO circuits inside the IO units. An IO power shutoff circuit is provided to the IO unifying unit on upstream side of the IO power distributing terminal and to each of the distribution branch lines in each of the IO units.

6 Claims, 9 Drawing Sheets

SAFETY CONTROLLER AND INPUT-OUTPUT UNIT THEREFOR

This application claims priority on Japanese Patent Application 2006-139784 filed May 19, 2006.

BACKGROUND OF THE INVENTION

This invention relates to a safety controller capable of adding input and output points in predetermined units such as safety PLCs of the so-called building block type and safety remote IO terminals connected to a safety PLC through communications.

Safety controllers of the type capable of adding input and output points in predetermined units such as safety PLCs of the building block type and safety remote IO terminals connected to a safety PLC through communications have been known. A safety controller of this type is basically structured such that any number of input-output (IO) units may be connectable to a single IO unifying unit which is a CPU unit in the case of a safety PLC and a communication unit in the case of a safety remote IO terminal.

Several connecting structures have been proposed for connecting a desired number of IO units to a single IO unifying unit.

A back plane connecting structure is one of the known examples of such connecting structure. According to this example, connectors are provided at certain intervals on a motherboard with a bus line and each connector is connected to the connector of one of the units such that the IO unifying unit can be connected to the individual ones of the IO units.

According to another example, inter-unit connectors are used as the connecting structure. Male and female connectors are provided to one of the surfaces of the case of the IO unifying unit and both left-hand and right-hand side surfaces of the case of each of the IO units and partial buses are provided inside the IO units for connecting the connectors on the left-hand and right-hand sides. If these units are connected in a series, a continuous bus line is formed from the IO unifying unit to the series of IO units.

Figure 10:
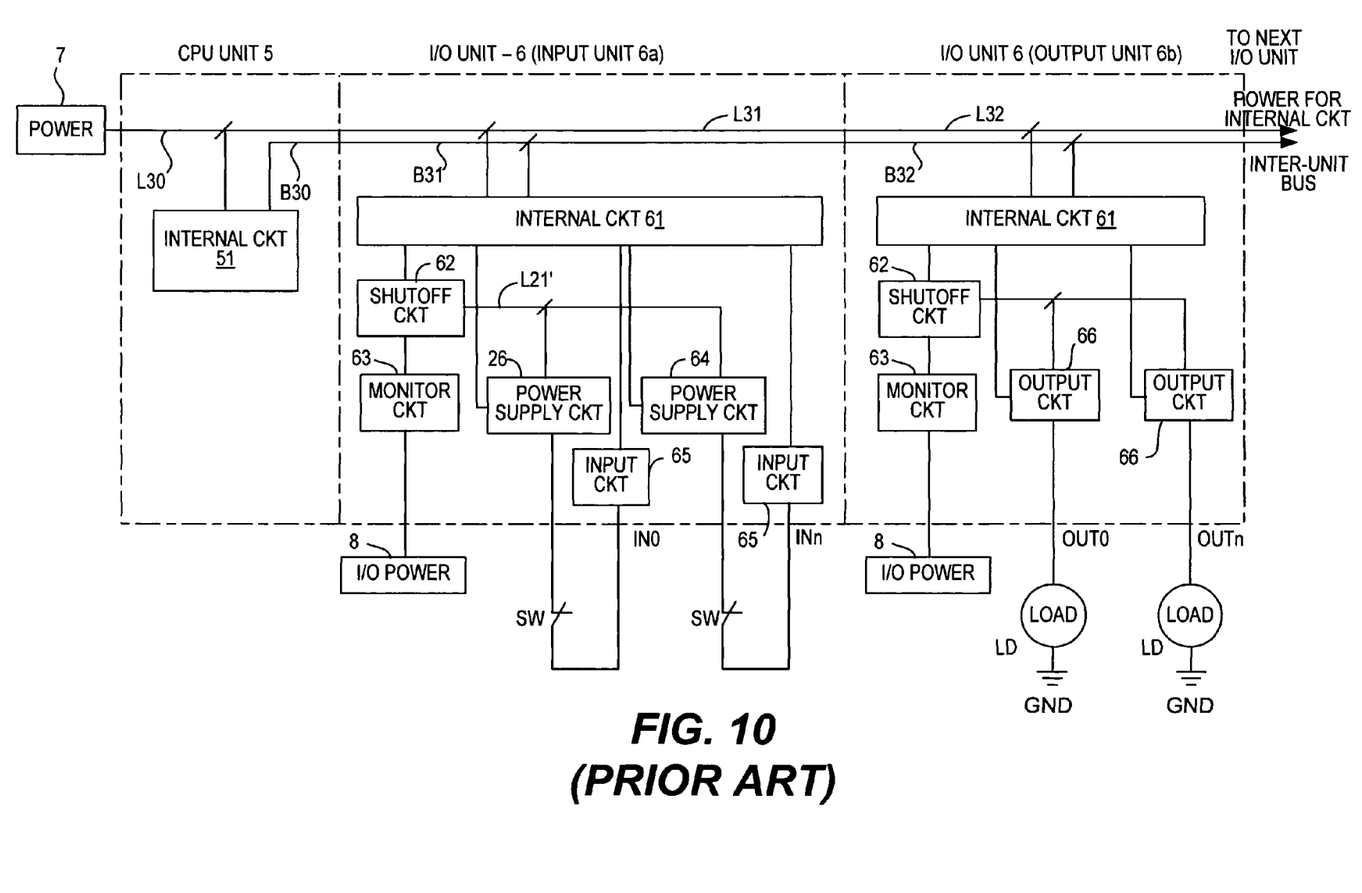
FIG. 10 is a structural diagram of a prior art safety PLC.

FIG. 10 shows the structure of a prior art safety PLC as an example of safety controller, having a single CPU unit 5 of a building block type connectable to any number of IO units 6 such as an input unit 6a and an output unit 6b.

An internal circuit 51 is contained inside the CPU unit, and each IO unit 6 contains its internal circuit 61. Each of these internal circuits 51 and 61 is structured by a microcomputer including a microprocessor (MPU) and a memory and these microcomputers serve to realize the various functions of the CPU unit 5 and the IO units 6. The CPU unit 5 has a power-receiving terminal for receiving power from a power source 7 for internal circuits. The power thus received is distributed through power distribution lines L30, L31 and L32 to the internal circuits 51 and 61 inside each unit so as to activate them. B30, B31, B32, etc. indicate an inter-unit bus which is used for exchanging input and output data among the CPU unit 5 and each of the IO units 6.

Each IO unit 6 includes input circuits 65 if it is an input unit 6a and output circuits 66 if it is an output unit 6b. As well known to persons skilled in the art, each input circuit 65 is for creating a logical signal corresponding to the on-off condition of a corresponding external switch SW and communicating it to the associated internal circuit 61 and each output circuit 66 is for driving a corresponding load LD according to a logical signal outputted from the associated internal circuit 61.

Each IO unit 6 receives power from an IO power source 8. If the IO unit 6 is an input unit 6a, the power received from the IO power source 8 is supplied through a voltage monitoring circuit 63 and a power line shutoff circuit 62 to a power supply circuit 64 for each input channel adapted to be on-off controlled by the internal circuit 61. If the IO unit 6 is an output circuit 6b, the power received from the IO power source 8 is supplied through a voltage monitoring circuit 63 and a power line shutoff circuit 62 to the output circuit 66 of each output channel. Each output circuit 66 is on-off controlled by the internal circuit 61.

In the field of factory automation, there is a strong desire to realize an improved IO structure with a reduced control unit number (or to reduce the number of unused IO points in a IO units) and to miniaturize the IO unit itself by making it slimmer such that changes in and addition to the system can be easily effected.

In the case of a prior art safety controller as shown in FIG. 10, IO units with a large number of points may not present a problem but there are problems in miniaturizing the system and reducing the point number. For example, IO power sources 8 are connected for supplying power to external IO devices such as switches SW and loads LD, and this means that terminals are required for each IO unit 6. The user will be required to provide wires for these units 6 and this will mean an additional cost for the wiring and an increased size of the control board with a large wiring duct, contrary to the original wish for miniaturization.

Moreover, since the voltage monitoring function for the IO power source 8, components for reducing noise and fuses will have to be mounted to each of the IO units 6, it is difficult to prevent the cost and the space required for the mounting from increasing.

SUMMARY OF THE INVENTION

It is therefore an object of this invention in view of these problems of prior art technology to provide a safety controller which will not make it necessary to increase the cost of wiring or to make the control board larger because of an increase in the number of wires for the power source as the IO unit is miniaturized or the number of point is reduced, such that an IO structure with no waste can be realized regarding the number of control points and such that changes in and additions to the system can be easily effected.

Other objects and effects of the present invention will become clear from the description given below.

A safety controller of this invention is of the so-called building block type, or in a building block configuration and comprises an array of a plurality of IO units each including IO circuits and a single IO unifying unit that is connectable to these IO units. In the above, the IO unifying unit is a CPU unit if the safety controller is a safety PLC. If the safety controller is a safety remote IO terminal, this corresponds to a communication unit for communicating with the safety PLC.

The IO unifying unit is provided with an IO power-receiving terminal for receiving power from an external IO power source and an IO power distributing terminal for distributing the received power to the array of IO units after passing inside the IO unifying unit. The array of IO units includes distribution mains that extend along the array and have a starting end connected to the IO power distributing terminal and distribution branch lines for supplying power from the distribution mains to each of the IO circuits inside the IO units. Moreover, there are further provided IO power shutoff means to the IO unifying unit on upstream side of the IO power distributing terminal and to each of the distribution branch lines in each of the IO units. With such a structure, power can be supplied to the IO circuits inside the IO units through the IO unifying unit, the distribution mains and the distribution branch lines selectably in units of the distribution mains and the distribution branch lines. Moreover, since terminals for receiving IO power do not appear on each IO unit, the cost for wiring need not be considered when the IO units are miniaturized.

The IO unifying unit in the safety controller of this invention may further include a voltage monitor that serves to monitor IO power source voltage and to activate the IO power shutoff means on upstream side of the IO power distributing terminal to thereby shut off supply of power to the distribution mains if the monitored IO power source voltage exceeds a specified value. With such a structure, the IO power source voltage at each of the IO units can be monitored in a unified manner on the side of the IO unifying unit and hence the circuit elements for monitoring the IO power source voltage inside the individual IO units can be dispensed with and hence the IO units can be miniaturized accordingly.

The single IO unifying unit and the IO units of the safety controller of this invention may each include a diagnosing means for carrying out a diagnosis by experimentally switching on and off the IO power shutoff means associated therewith and thereby determining whether the IO power shutoff means functions normally or not, the IO unifying unit and the IO units carrying out the diagnosis at different times (with a delay in between). With such a structure, when a diagnosis process is being carried out either on the side of the IO unifying unit or on the side of the IO units, the process is not being carried out on the other side. Thus, an error due to competition therebetween can be reliably prevented.

The aforementioned IO power shutoff means provided to the IO unifying unit may be arranged so as to shut off supply of power to the IO unifying unit whenever the voltage of IO power supplied thereto becomes outside a specified range, whenever a hardware abnormality is detected by a microprocessor forming an internal circuit of the IO unifying unit, and whenever a watchdog timer of the microprocessor has counted up its time.

In the above, examples of situation where hardware abnormality is detected is detected by the microprocessor include diagnostic abnormalities in the IO diagnostic circuit, abnormalities in internal RAM/FROM, abnormalities in external RAM/FROM and abnormalities in cross communication with another MPU. With such a structure, distribution of IO power to each IO unit can be appropriately and summarily controlled corresponding to abnormalities of various types recognizable on the side of the IO unifying unit.

The IO power shutoff means provided to each of the IO units may be arranged so as to shut off supply of power to the corresponding IO unit whenever the voltage of IO power supplied thereto becomes outside a specified range, whenever voltage of power for an internal circuit of the corresponding IO unit becomes outside a specified range, whenever an abnormal condition has occurred between the IO unifying unit, whenever a hardware abnormality is detected by a microprocessor forming said internal circuit, and whenever a watchdog timer of said microprocessor has counted up time. With such a structure, distribution of IO power to each IO unit can be appropriately and summarily controlled corresponding to abnormalities of various types recognizable on the side of the individual IO units.

Each of the IO units provided to the safety controller of this invention as described above may comprise an IO circuit for connection to an external device, an internal circuit for controlling operations of the IO circuit, IO circuit line for the IO circuit serving to supply power for the operations of the IO circuit and internal circuit line for supplying power for operations of the internal circuit, the IO circuit line and the internal circuit line being mutually insulated from each other, the IO circuit line and the internal circuit line being each separately provided with a power-supplying terminal for supplying power thereto from outside, the internal circuit line being a branch line branching from a distribution line for an internal circuit of an CPU unit of the safety controller.

This invention makes it possible to provide a safety controller which will not make it necessary to increase the cost of wiring or to make the control board larger because of an increase in the number of wires for the power source as the IO unit is miniaturized or the number of point is reduced, such that an IO structure with no waste can be realized regarding the number of control points and such that changes in and additions to the system can be easily effected.

DETAILED DESCRIPTION OF THE INVENTION

Figure 1:
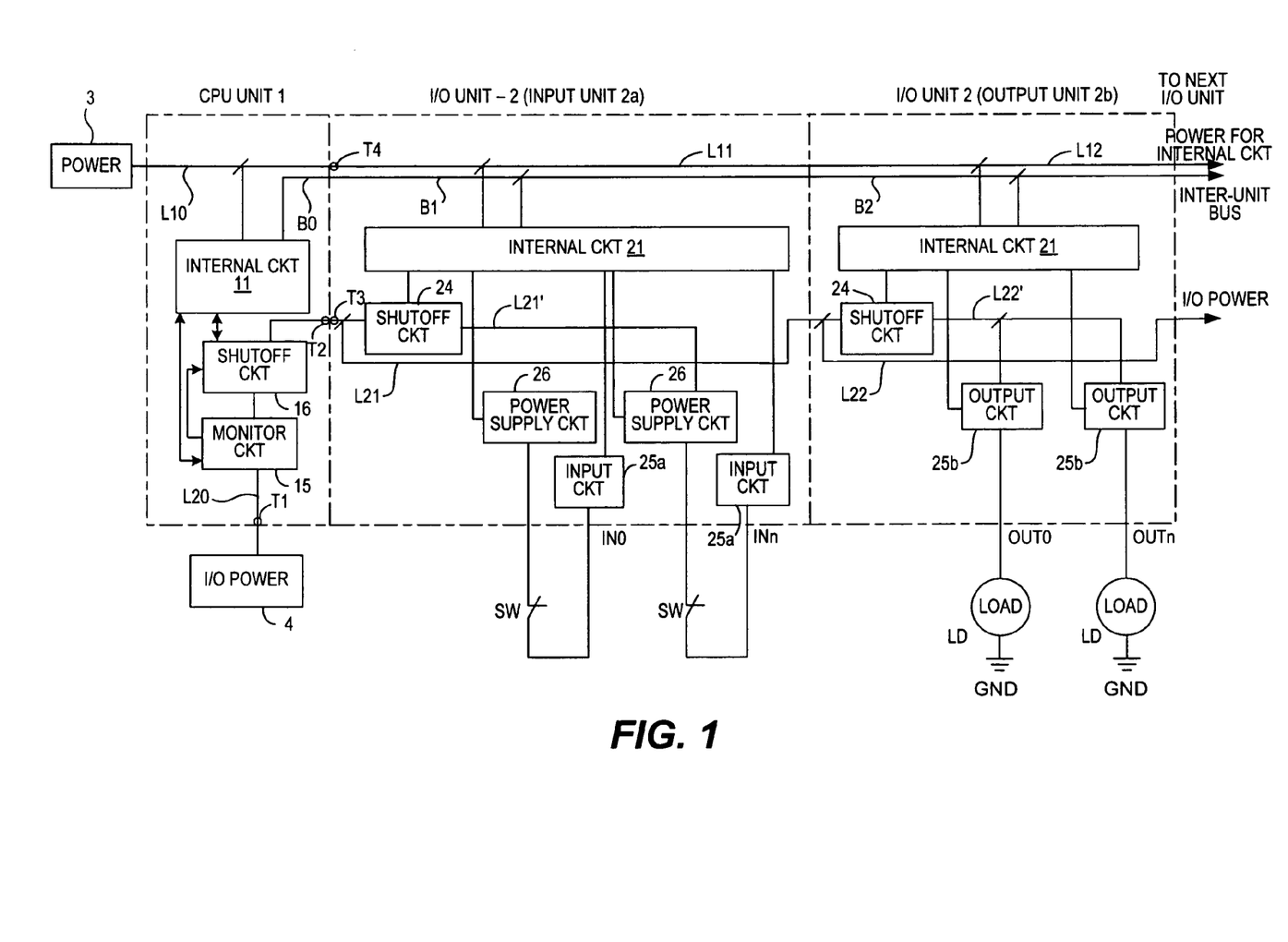
FIG. 1 is a structural diagram of a safety PLC embodying this invention.

FIG. 1 shows the structure of a safety PLC embodying this invention as a building block type safety controller having a single CPU unit 1 (corresponding to a unifying 10 unit) connectable to any number of IO units 2 by using any type of connecting structure such as the back plane structure or the connector connection structure as explained above.

The CPU unit 1 includes an internal circuit 11, and each of the IO units 2 includes its own internal circuit 21. As explained above, each of these internal circuits 11 and 21 may comprise a microcomputer having a microprocessor and a memory.

The input unit 2a, which is adjacent to the CPU unit 1, is provided with a plural number of input circuits 25a each for reading in the operation status of an external switch SW by converting it into a logical signal, the number of the input circuits 25a being equal to a specified number of channels. The output unit 2b, which is adjacent to the CPU 1 with the input unit 2a sandwiched therebetween, is provided with another plural number of output circuits 25b each for driving a load LD in response to a logical output signal, the number of the output circuits 25b being equal to another specified number of channels. The input and output circuits 25a and 25b are as explained above regarding a prior art example.

The power system for the internal circuits 11 and 21 are explained next. The CPU unit 1 includes internal distribution main L10, the input unit 2a includes internal distribution main L11, and the output unit 2b includes internal distribution main L12.

The left-hand end of internal distribution main L10 is a power-receiving terminal (not shown) through which power is supplied from a power source 3 for internal circuits. The right-hand end of internal distribution main L10 is a distribution terminal (not shown), connected through a connector (T4) to the left-hand end of distribution main L11 inside the adjacent input unit 2a. The right-hand end of distribution main L11 and the left-hand end of distribution main L12 inside the output unit 2b are similarly connected through a connector. As a result, a distribution main is formed by the series of distribution mains L10, L11 and L12. Power is supplied to the internal unit 11 inside the CPU unit 1 and the internal units 21 inside the IO units 2 through this connected distribution main. In FIG. 1, B0, B1 and B2 indicate inter-unit buses for exchanging input and output data between the CPU unit 1 and each of the IP units 2.

Next, the power system for input-output (IO) is explained. Distribution main L20 is included in the CPU unit 1, distribution main L21 is included in the input unit 2a, and distribution main L22 is included in the output unit 2b. In addition, distribution branch line L21' off the distribution main L21 is included in the input unit 2a and distribution branch line L22' off the distribution main L22 is included in the output unit 2b.

The starting end (the lower end in FIG. 1) of distribution line L20 inside the CPU unit 1 is a power-receiving terminal (T1) through which power is received from a power source 4 for IO. The right-hand end of distribution line L20 inside the CPU unit 1 is an IO distribution terminal (T2), connected through a connector (T3) to the left-hand end of distribution main L21 inside the adjacent input unit 2a. The right-hand end of distribution main L21 inside the input unit 2a is connected through a connector (not shown) to the left-hand end of distribution main L22 inside the adjoining output unit 2b. Similar connections are made sequentially to the distribution mains inside further IO units. As a result, a distribution main is formed by the series of distribution mains L20, L21, L22, etc. Power is supplied to the power supply circuits 26 in the individual input channels through the distribution branch line L21' branching from distribution main L21. Similarly, power is supplied to the output circuits 25b in the individual channels through the distribution branch line L22' branching from distribution main L22.

A voltage monitoring circuit 15 and a power line shutoff circuit 16 are inserted on the distribution main L20 inside the CPU unit 1. The voltage monitoring circuit 15 carries out the monitoring of voltage according to a command from the internal circuit 11, outputting specified shutoff signal to the power line shutoff circuit 16 if the voltage of the power source 4 for IO becomes outside a regular range and causing the power line shutoff circuit 16 to carry out a specified shutoff operation, thereby stopping the distribution of power of IO from the CPU unit 1 to each of the IO units 2. In other words, if an abnormality in the voltage of the power source 4 for IO is detected on the side of the CPU unit 1, the supply of power for IO to all of the IO units 2 is summarily shut off. As will be described below, the power line shutoff circuit 16 is shut off and caused to supply power also under the control of the internal circuit 11.

Each of the distribution branch lines L21' and L22' for IO inside each of the IO units 2 has an IO power line shutoff circuit 24 inserted thereon. These IO power line shutoff circuits 24 are adapted to carry out shutoff and power-on operations under the control of the internal circuit 21. When the shutoff operation is carried out, the supply of power to the power supply circuits 26 is shut off if it is inside the input unit 2a, and the supply of power to the output circuits 25b is shut off if it is inside the output unit 2b. By controlling these IO power line shutoff circuits 24 appropriately by the internal circuit 21, the supply of power for IO for each IO unit can be shut off.

By comparing FIG. 1 with FIG. 10, the difference between the present invention and the prior art will become clearly understandable. According to the prior art shown in FIG. 10, the supply of power to the power supply circuits 65 and the output circuits 66 inside the IO units 6 is carried out by the power sources 8 for IO provided individually to the input units. For this reason, each of the IO units is required to be provided with a power-receiving terminal such as a screw stopper terminal or a cable connector.

If it is attempted to form an efficient IO structure in view of a given number of control points required for an equipment or to miniaturize the IO unit itself and to reduce the number of control points, the number of IO units increases necessarily. If wiring is provided individually to these IO units, the cost of wiring increases and the distribution board becomes larger.

If a safety PLC according to this invention as shown in FIG. 1 is used instead, the supply of power to the power supply circuits 26 and the output circuits 25b of the individual IO units 2 is effected through the distribution main L20 inside the CPU unit 1, the distribution branch line L21' inside the input unit 2a and the distribution branch line L22' inside the output unit 2b. Thus, it is not necessary to provide the individual IO units 2 with any power-receiving terminal, and the number of input and output points per unit can be reduced. This means that the number of wiring for IO does not increase even if the number of input units is increased. As a result, the cost of wiring is not adversely affected and the control board or the wiring duct) can be prevented from becoming larger.

Figure 2:
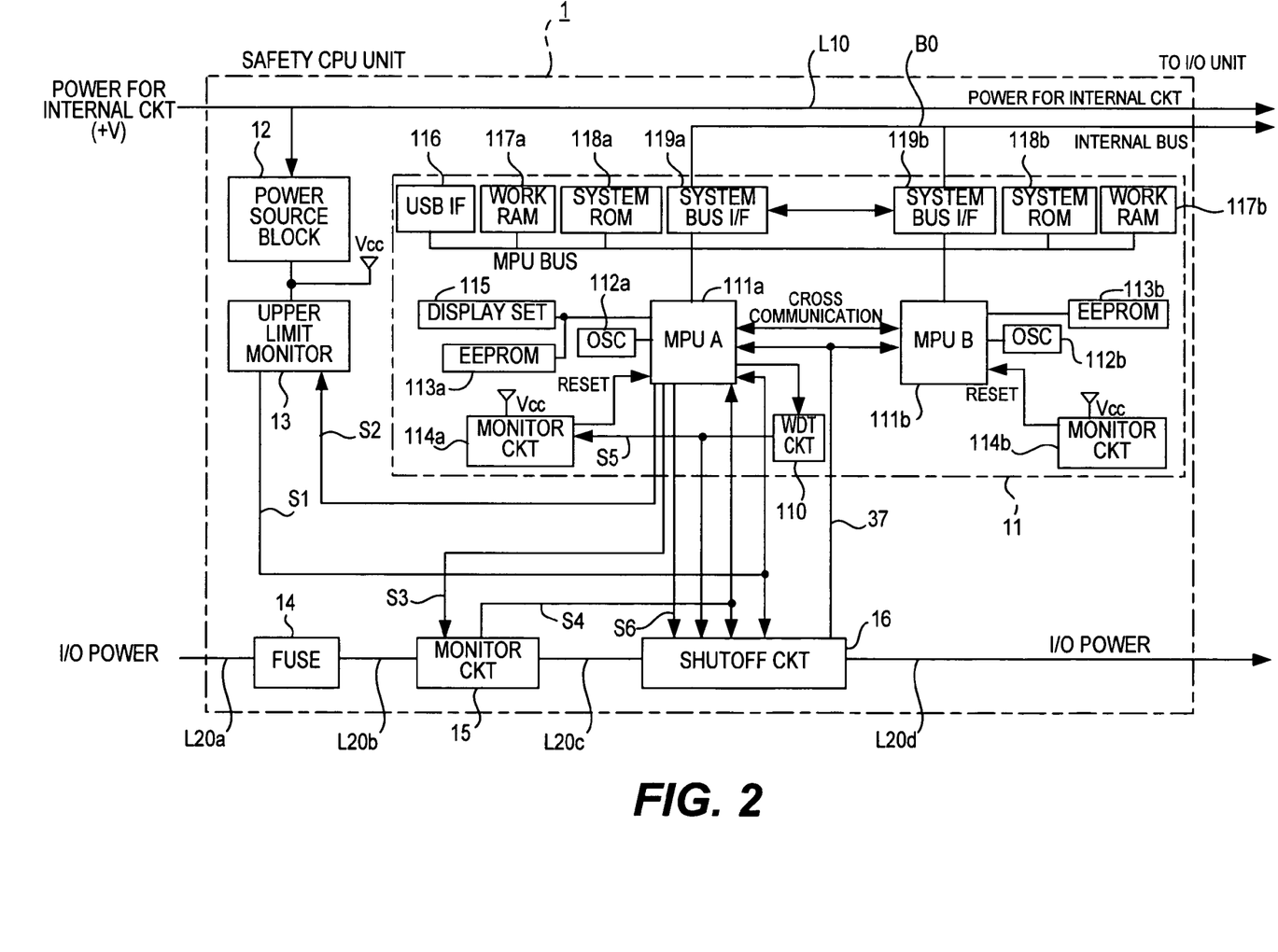
FIG. 2 is a structural diagram of a safety CPU unit embodying this invention.
Figure 3:
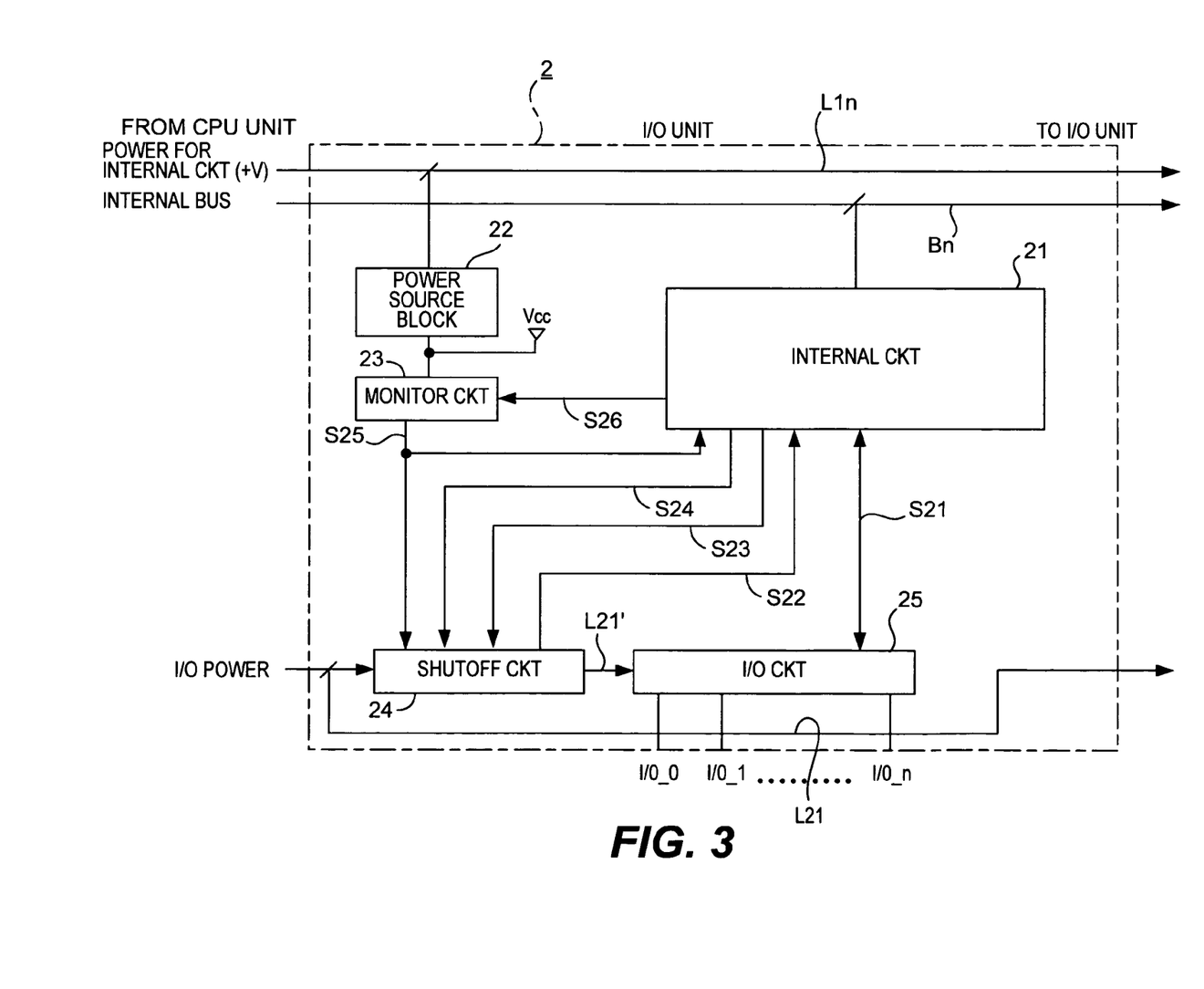
FIG. 3 is a structural diagram of a safety IO unit embodying this invention.

Next, the structure of the safety CPU unit and IO unit of this invention is explained more in detail with reference to FIGS. 2 and 3.

FIG. 2 shows the detailed structure of a safety CPU unit, comprising an internal circuit 11, a power source block 12 for the internal circuit, an upper limit monitoring circuit 13, a fuse 14, a voltage monitoring circuit 15 for the IO power source and a shutoff circuit 16 for the IO power line.

The power source block 12 is adapted to receive power from the distribution main L10 and to convert the source voltage for the internal circuit from +V (such as +24V) to Vcc (such as +5V) and to stabilize it.

The fuse 14, the voltage monitor circuit 15 for the IO power source and the shutoff circuit 16 for the IO power line are sequentially on the distribution main for the IO power such that the distribution main L20 is divided into segments L20a, L20b, L20c and L20d, as shown in FIG. 2.

The internal circuit 11 includes a pair of microprocessors MPU-A 111a and MPU-B 111b. Oscillator circuits (OSC) 112a and 112b and non-volatile memories EEPROM 113a and 113b are provided as their auxiliary elements. One of the microprocessors MPU-A 111a is further provided with a display setting part 115. Work RAM 117a, system ROM 118a and system bus I/F 119a are provided to MPU-A and similarly work RAM 117b, system ROM 118b and system bus I/F 119b are provided to MPU-B. Voltage monitoring circuits 114a and 114b are provided respectively to MPU-A and MPU-B. Numeral 100 indicates a watchdog timer (WDT) circuit for detecting an abnormal operation by MPU-A.

As explained above, the voltage monitoring circuit 15 has the function of monitoring whether the IO power source voltage has become outside a regular range. This diagnosis is carried out by a monitoring diagnosis signal S3 outputted from MPU-A 111a. If the voltage monitoring circuit 15 detects the IO power voltage being outside its regular range, an abnormality signal S4 is outputted therefrom. As this abnormality signal S4 is received, the shutoff circuit 16 carries out its shutoff operation.

When the watchdog timer circuit 110 counts up its time, a WDT time-up signal S5 is outputted. As the WDT time-up signal S5 is received, the shutoff circuit 16 carries out its shutoff operation.

When the voltage monitoring circuits 114a and 114b have detected an abnormality in voltage Vcc and reset signals are supplied to both microprocessors MPU-A and B 111a and 111b, an IO power source shutoff signal S6 outputted from one of the microprocessors MPU-A becomes active and as this is received, the shutoff circuit 16 carried out its shutoff operation.

The IO power source shutoff signal S6 is adapted to correspond also to various other kinds of abnormalities. This is also outputted when an abnormality is detected by a cross-communication between the two microprocessors MPU-A and B 111a and 111b and causes the shutoff circuit 16 to carry out its shutoff operation, and as the shutoff circuit 16 carries out its shutoff operation, the IO power sources for all IO units are summarily shut off.

FIG. 3 shows the detailed structure of a safety IO unit, comprising an internal circuit 21, a power source block 22 for the internal circuit, a voltage monitoring circuit 23 and a shutoff circuit 24 for the IO power line and an IO circuit 2.

The power source block 22 is approximately the same as the one inside the CPU unit, operating by receiving power from the distribution main L1n inside the unit to convert the source voltage for the internal circuit from +V (such as +24V) to $V_{cc}$ (such as +5V) and to stabilize it.

The voltage monitoring circuit 23 has the function of monitoring the voltage $V_{cc}$ generated by the power source block 22 and detecting whether this has gone outside its regular range or not. The diagnosis of this voltage monitoring circuit is carried out by way of monitoring circuit diagnosis signal S26. As the voltage monitoring circuit 23 detects an abnormality in the internal voltage, an abnormality signal S25 is outputted from the voltage monitoring circuit 23. As this is received, the shutoff circuit 24 carries out its shutoff operation.

As explained above regarding the CPU unit, shutoff and WDT time-up signals S24 and S23 are outputted respectively from the internal circuit 21, and the shutoff circuit 24 carries out its shutoff operation as these signals are received.

The shutoff circuit 24 is provided also with a monitoring function, and the IO power voltage thus monitored is taken in into the internal circuit 21 as IO power monitor signal S22. An IO signal S21 corresponding to the input logical signal and the output logical signal is exchanged between the internal circuit 21 and the IO circuit 25 (25a or 25b). L21 in the figure indicates a distribution main inside the unit and L22 indicates a distribution branch line.

Figure 4:
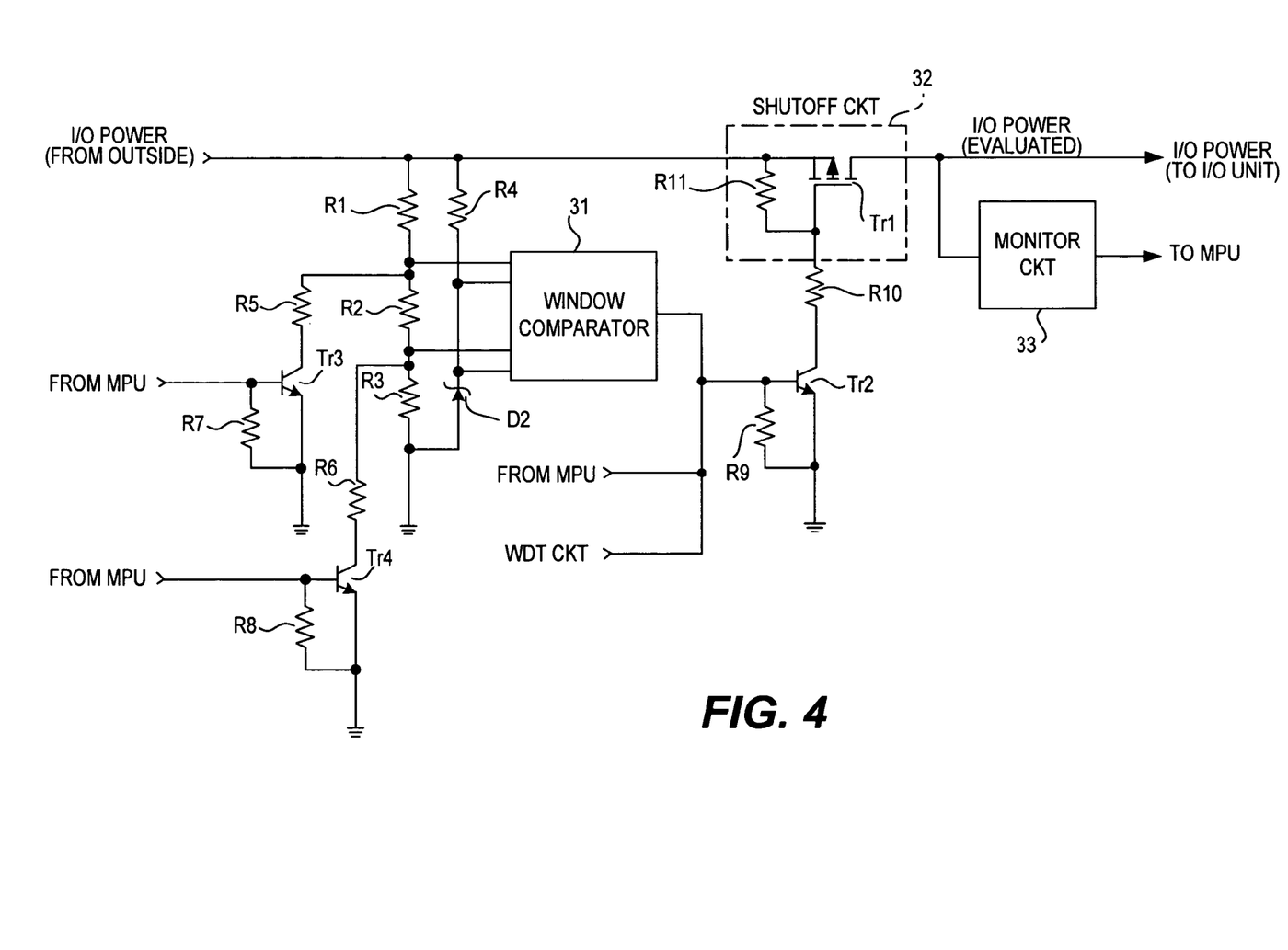
FIG. 4 is a structural diagram of an IO power source line related circuit.

FIG. 4 shows the structure of an IO power source line related circuit, which may be used as the shutoff circuit shown in FIG. 3. The IO power source line related circuit shown in FIG. 4 is structured so as to be able to carry out self-diagnosis under the control of the internal circuit 21, comprising a window comparator (upper and lower limit monitoring) 31, a shutoff circuit 32 and a voltage monitoring circuit 33 as its principal components.

The window comparator 31 compares divided voltage value $V_{uv}$ for detecting the lower voltage limit and divided voltage value $V_{ov}$ for detecting the upper voltage limit, generated by resistor ladder R1, R2 and R3, with a reference voltage $V_a$ generated by resistor R4 and Zener diode D2. As the IO source power voltage rises and falls, its divided voltage values $V_{uv}$ and $V_{ov}$ fluctuate such that it is normally possible to monitor whether the IO source power voltage is within its regular range or not. When the output from the window comparator 31 becomes "H", transistor Tr2 is switched on such that transistor Tr1 forming the shutoff circuit 32 is switched off, carrying out the shutoff function. In this situation, the secondary voltage of the shutoff circuit 32 is received by a microprocessor (PMU) through the voltage monitoring circuit 33 for monitoring.

The shutoff function of this shutoff circuit 32 can be caused also by a signal from the microprocessor MPU or a signal from the watchdog timer circuit.

The voltage of each junction points of voltage divider resistors R1, R2 and R3 can be individually pulled down by means of two driver circuits, one of them being formed with transistor Tr3 and resistors R5 and R7, and the other of them being formed with transistor Tr4 and resistors R6 and R8. If a shutoff signal is supplied from the microprocessor MPU to the base of transistors Tr3 and Tr4, an abnormal condition with the IO power voltage outside the regular range can be artificially created such that the window comparator 31 is forcibly activated. This will cause the shutoff circuit 32 to carry out its shutoff function and the shutoff condition will be monitored by the microprocessor MPU through the voltage monitoring circuit 33. In summary, it is possible to forcibly check whether the circuit from the window comparator 31 to the shutoff circuit 32 is normally functioning.

Figure 5:
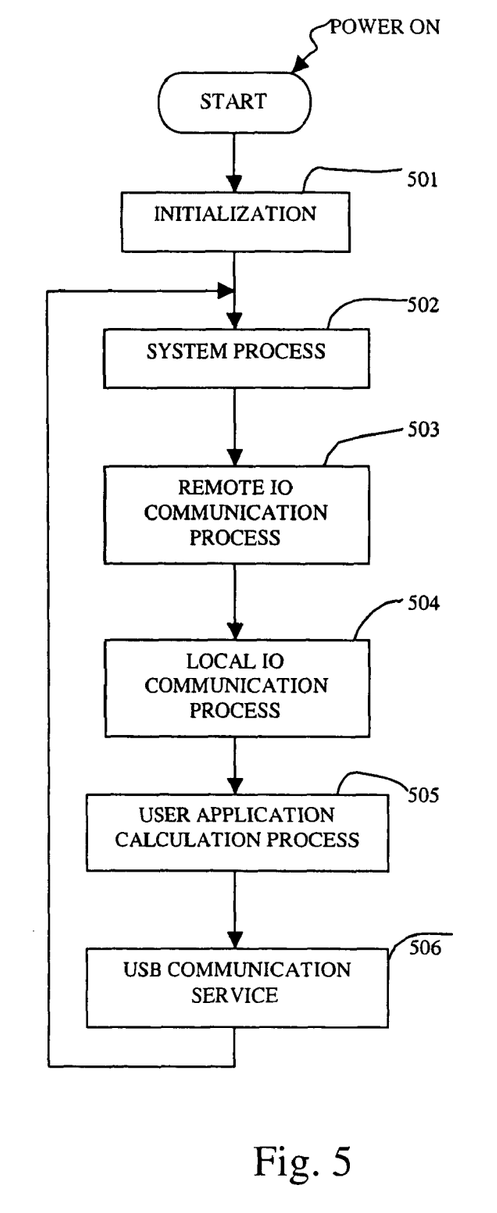
FIG. 5 is a flowchart of the series of operations by the safety CPU unit.

The series of operations by the safety CPU unit of this invention thus structured as explained above will be explained next with reference to the flowchart of FIG. 5.

As power is switched on and the process is started, an initialization step (Step 501) is carried out, inclusive of the initialization of the hardware, and the reading of set data.

Next, the system process is carried out (Step 502) inclusive of the synchronization among the microprocessors and hardware self-diagnosis (inclusive of the self-diagnosis of the shutoff circuit) by a known method.

Next, the remote IO communication process is carried out (Step 503), inclusive of exchange of input and output data through the network with safe remote IO terminals (not shown) connected to this safety PLC.

Next, the local IO communication process is carried out (Step 504), inclusive of processes such as the refresh of IO data for the IO unit, reading of status data of IO unit and transmission of status data of CPU unit (inclusive of completion of diagnosis of the shutoff circuit) or commands.

Next, as the user application calculation process is carried out (Step 505), the user application created by the user by appropriately using ladder diagrams and language is calculated. Thereafter, the USB communication service (Step 506) is carried out and Steps 502-506 are repeated.

Figure 6:
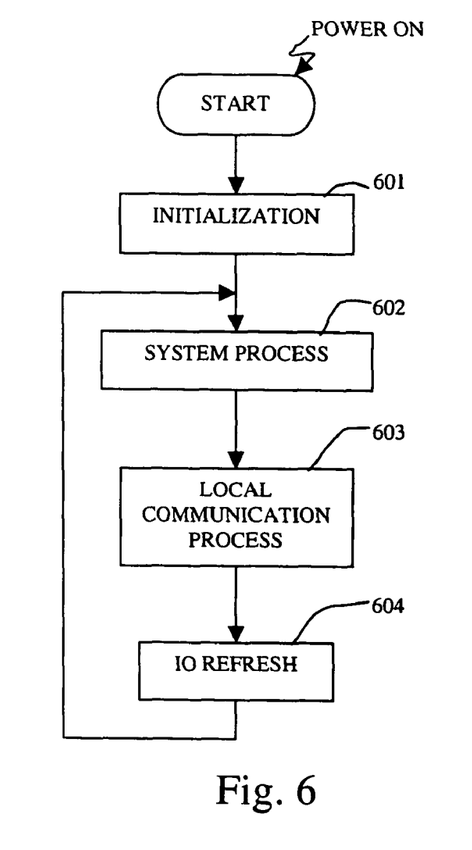
FIG. 6 is a flowchart of the series of operations by the safety IO unit.

Next, the series of operations by a safety IO unit will be explained with reference to the flowchart of FIG. 6. As power is switched on and this process is started, an initialization step (Step 601) is carried out, inclusive of the initialization of the hardware, and the reading of set data.

Next, the system process is carried out (Step 602) inclusive of the synchronization among the microprocessors and hardware self-diagnosis (inclusive of the self-diagnosis of the shutoff circuit) by a known method.

Next, as the local IO communication process is carried out (Step 603), processes such as transmission of input data to the CPU unit, reception of output data from the CPU unit, transmission of status data of the IO unit to the CPU unit and reception of status data (inclusive of a report on completion of the shutoff process) or command of the CPU unit are carried out.

In the subsequent IO refresh process (Step 604), IO data are exchanged between the internal circuit and the IO circuit 25. Then, the series of the processes explained above (Steps 602-604) is repeated.

Next, the IO power source line diagnosis process on the side of the safety CPU unit is explained in detail with reference to the flowchart of FIG. 7. As this process is started, it is firstly determined whether the IO power source is in the ON-condition or not (Step 701). If the IO power source is not in the ON-condition (NO in Step 701), a "diagnosis end flag" is set to be in the OFF-condition (Step 708). If the IO power source is in the ON-condition (YES in Step 701), the condition of the diagnosis end flag is referenced (Step 702). If this flag is not in the OFF-condition (NO in Step 702), the subsequent steps are skipped and the process is terminated. If the flag is in the OFF-condition (YES in Step 702), the diagnosis process is started as shown in FIG. 4 by providing the shutoff signal to cause the shutoff circuit 32 to carry out the shutoff operation (Step 703), and it is examined under this condition through the voltage monitoring circuit 33 whether or not the IO power source has been switched off (Step 704).

If the Off-condition of the IO power source is not detected through the voltage monitoring circuit 33 although the shutoff circuit 32 was caused to carry out its shutoff operation (NO in Step 704), the IO power source is shut off, the safety output to the IO unit is switched off, a display of abnormality is made on an LED (not shown) and an abnormality condition is registered in a memory (Step 709) before the process is terminated.

If the OFF-condition of the IO power source is detected as a result of the shutoff operation by the shutoff circuit 32 (YES in Step 704), the IO power source voltage monitoring diagnosis process (to be explained below) is carried out (Step 705).

If abnormality of the type to be explained below is detected after the shutoff circuit 32 is caused to carry out its shutoff operation (YES in Step 704), the abnormality processes described above is carried out (Step 709).

If the diagnosis process of Step 705 is normally terminated, the diagnosis end flag is switched on (Step 706) and a report flag regarding the end of the diagnosis to the IO unit is switched on (Step 707) to terminate the process.

Figure 7:
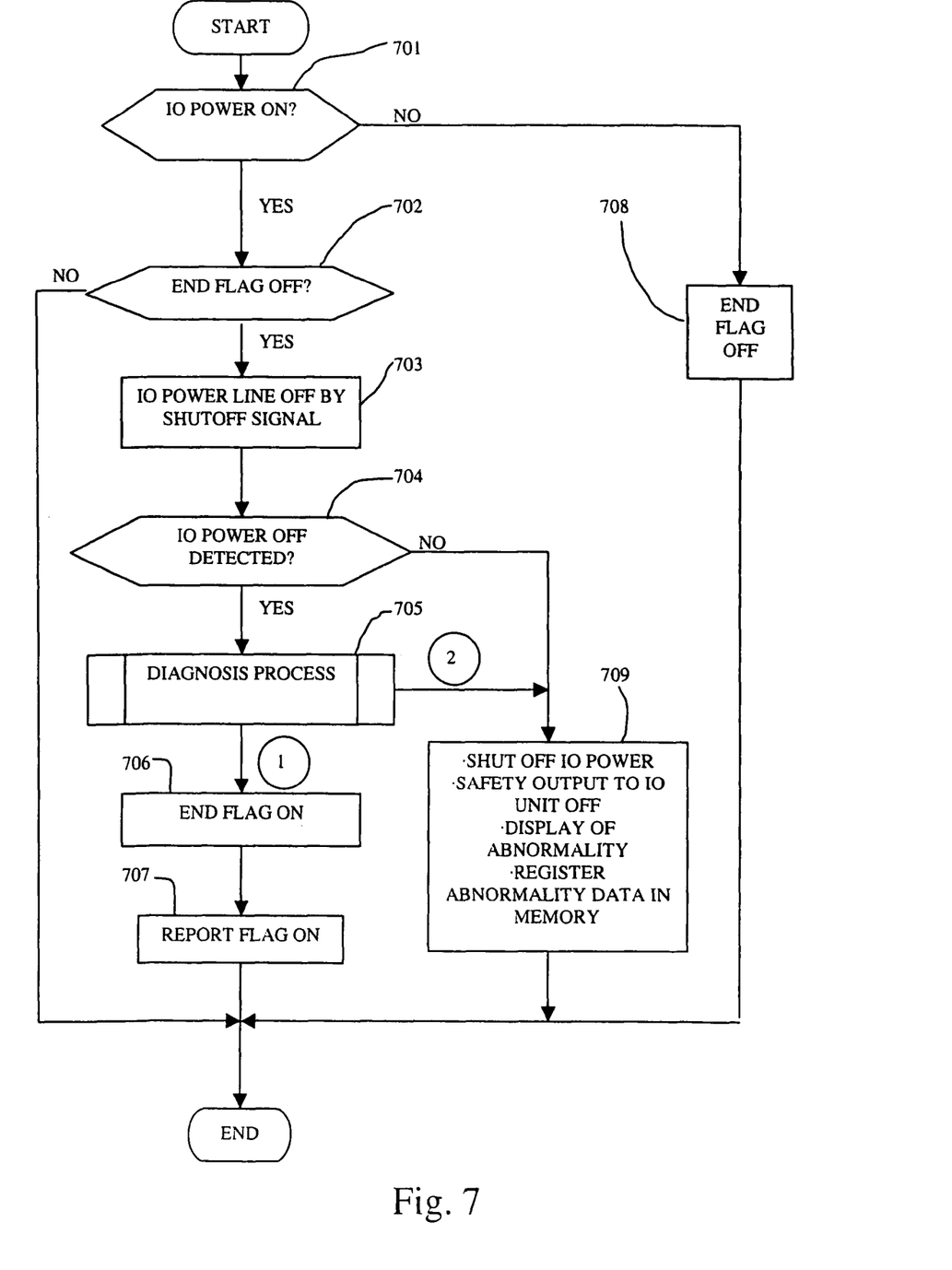
FIG. 7 is a flowchart of the IO power source line diagnosis process on the side of the safety CPU unit.
Figure 8:
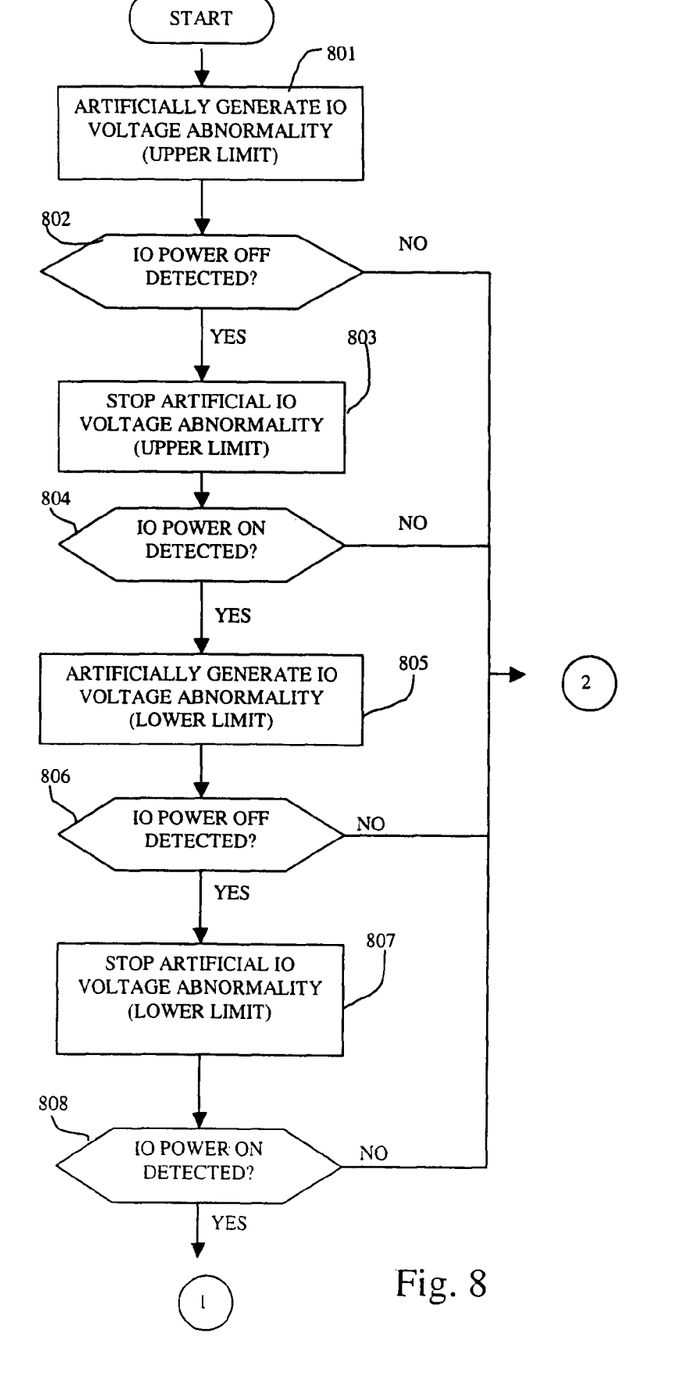
FIG. 8 is a flowchart of the IO power source line diagnosis process.

FIG. 8 is a detailed flowchart of the diagnosis process for the IO power source voltage monitoring circuit, started when the IO power source is detected to be in the OFF-condition in Step 704 of FIG. 7.

This process starts by artificially generating an abnormality regarding the upper limit of the IO voltage (Step 801). Next, a stop process on an artificial abnormality (regarding upper limit) is carried out (Step 803) under the premise that the OFF-condition of the IO power source has been detected (YES in Step 802), and a process of artificially generating an abnormality (regarding lower limit) is carried out (Step 805) under the premise that the ON-condition of the IO power source has been detected (YES in Step 804). Next, a stop process on an artificial abnormality (regarding lower limit) is carried out (Step 807) under the premise that the OFF-condition of the IO power source has been detected (YES in Step 806), and the diagnosis end flag is switched on (Step 706) under the condition that the ON-condition of the IO power source has been detected (YES in Step 808).

In the above, if the OFF-condition of the IO power source is not detected in Step 802 or Step 806, or if the ON-condition of the IO power source is not detected in Step 804 or Step 808, the processes in Step 709 are carried out.

By the process described above, a diagnosis is carried out only when the ON-condition of the IO power source is detected through the voltage monitoring circuit 15 and the diagnosis end flag is in the OFF-condition, or whenever the IO power source is switched on. Thus, the condition of the IO power source line can be diagnosed frequently and the reliability of the operations of the CPU unit can be improved compared to the prior art technology according to which a diagnosis process is carried out only in the initial condition immediately after the power source for the internal circuit is switched on.

Next, the diagnosis process on the IO power source line on the side of the safety IO unit is explained in detail with reference to FIG. 9. As this process is started, as in the case of the CPU units described above, it is judged first whether the IO power source is in the ON-condition or not (Step 901). If it is judged not to be in the ON-condition (NO in Step 901), the diagnosis end flag is switched off and the diagnosis end flag of the CPU unit is also set in the OFF-condition (Step 910).

If the IO power source is judged to be in the ON-condition (YES in Step 901), it is next judged whether the diagnosis end flag is in the OFF-condition or not (Step 902). If the diagnosis end flag at this moment is judged not to be in the OFF-condition (NO in Step 902), the remaining steps are all skipped, and the process is terminated. If the diagnosis end flag is in the OFF-condition (YES in Step 902), it is judged whether the diagnosis end flag of the CPU unit is in the ON-condition (Step 903). Unless it is in the ON-condition (NO in Step 903), the remaining steps are equally all skipped and the process is terminated.

Only if the diagnosis end flag is switched off and that of the CPU unit is switched on (YES in Step 903), the diagnosis process of the IO power source line is started. In this case, the shutoff circuit 32 is forcibly put in a shut-off condition by means of the IO power source shutoff signal such that the IO power source line is put in the OFF-condition (Step 904) and it is judged through the voltage monitoring circuit 33 under this condition whether the OFF-condition is detected or not (Step 905). If the OFF-condition is not detected (NO in Step 905), processes including the IO power source shutoff process, that of setting the safety output in the OFF-condition, that of displaying an abnormality with the LED and that of informing the CPU unit of the abnormality condition are carried out (Step 911).

If the OFF-condition of the IO power source is detected through the voltage monitoring circuit 33 as a result of having forcibly setting the shutoff circuit 32 in a shutoff condition (YES in Step 905), the shutoff circuit 32 is set in a powered condition through the IO power source shutoff signal and setting the IO power source line in the ON-condition (Step 906). It is then judged through the voltage monitoring circuit 33 under this condition whether the ON-condition of the IO power source is detected (Step 907).

If the expected ON-condition is not detected through the voltage monitoring circuit 33 although the shutoff circuit 32 is in the powered condition (NO in 907), the processes in Step 811 for abnormal situation are carried out. If the ON-condition is detected (YES in Step 907), on the other hand, the diagnosis end flag is switched on (Step 908) and the end of the diagnosis is reported to the CPU (Step 909) to end the process.

By the process described above, a diagnosis is carried whenever the IO power source is switched on, as in the case of the CPU unit described above. Thus, the condition of the IO power source line is diagnosed frequently and the reliability on the side of the IO unit can be improved compared to the prior art technology according to which a diagnosis process is carried out only in the initialization immediately after the power source for the internal circuit is switched on.

Figure 9:
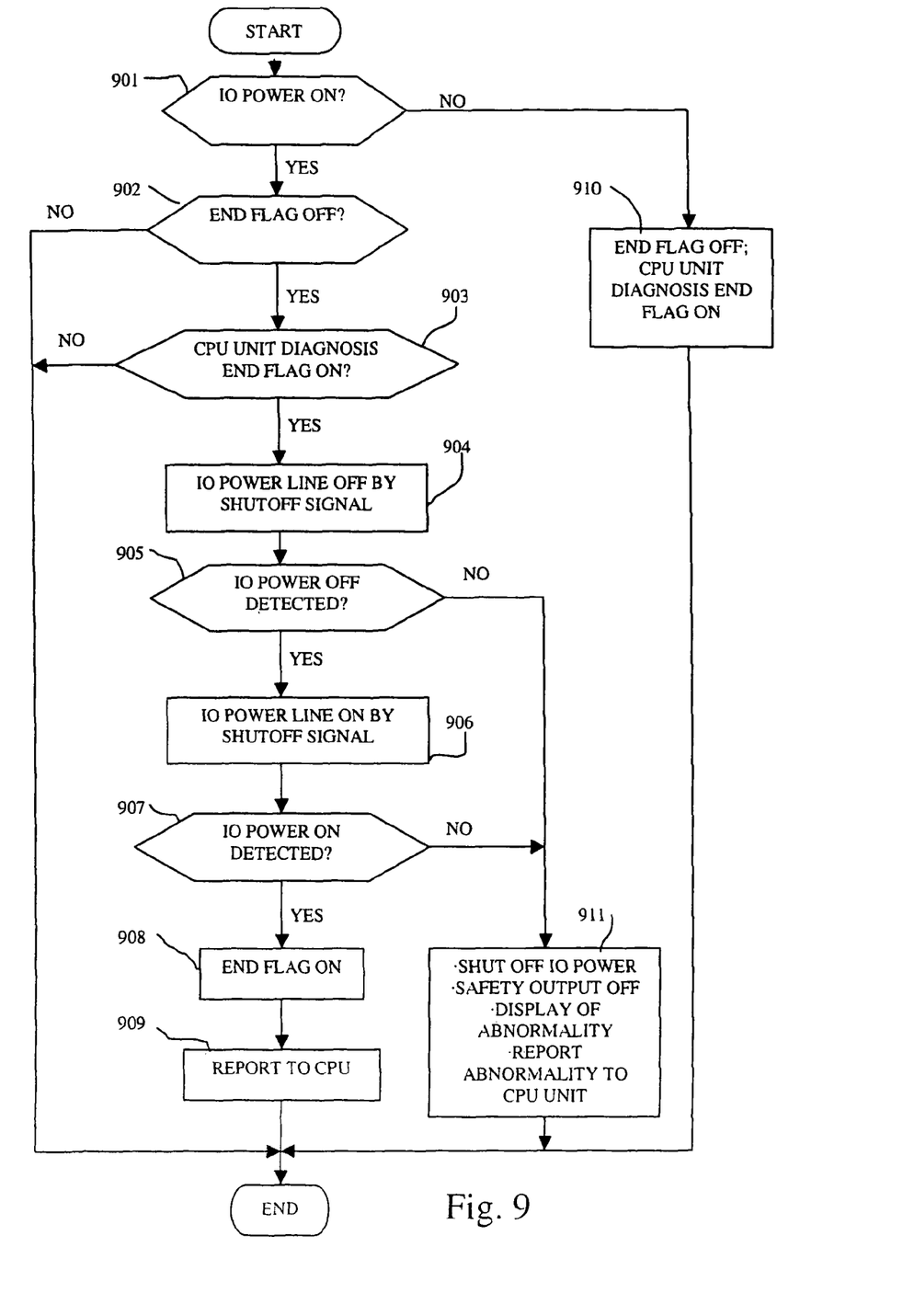
FIG. 9 is a flowchart of the IO power source line diagnosis process on the side of the safety IO unit.

Moreover, as can be clearly understood by referencing the flowcharts of FIGS. 7-9, the CPU unit and the IO unit are synchronized such that the diagnosis of one is not started unless that of the other is completed. In particular, since the shutoff circuit on the side of the CPU unit is switched on and off while that of the IO unit is being switched on and off for a diagnosis, the probability of their competing and resulting in an error can be reliably prevented.

Such a delay in the timing of diagnosis between the CPU unit and the IO unit need not be caused by a synchronization process as described above by using flags. It now goes without saying that many other ways can be adapted for this purpose such as a method of providing a time difference through different timers in synchronism with a specified reference timing.

As explained in detail above, it is not required according to the embodiments of this invention to provide any terminal (power-receiving terminal) for supplying IO power on the side of each of the IO units 2. Thus, the number of input-output points to be handled by each IO unit 2 is reduced, and hence even if the number of the IO units 2 may be increased, the number of wires for them need not be accordingly increased. As a result, flexibility of a safety controller of this type towards a system can be improved and a significantly more compact system can be realized.

According to this invention, furthermore, hardware for monitoring voltage on the side of each IO unit can be reduced by concentrating the monitoring function on the side of the CPU unit 1. For this reason, too, the IO units can be miniaturized according to this invention.

Another advantage of this invention is that the IO power source shutoff circuits themselves are provided with a function of self-diagnosis. Thus, reliability is improved and since the operations of self-diagnosis are carried out with a time delay between the sides of the CPU unit and the IO unit, errors due to their competition are reliably prevented.

Still another advantage of this invention is that not only is a shutoff circuit provided each in the CPU unit and the IO unit but also they can be shut off summarily, individually or for each channel, depending on the necessity, by shutting them off appropriately according to the result of judgment of abnormality inside these units.

Safety controllers described above are adapted to be used in a safety control system. Such a safety control system includes safety IO terminals and may be used together with a cutting or chopping machine or a production robot with arms. Safety controllers are provided not only with functions of logical calculations and input-output control similar to ordinary programmable controllers (PLC) but also with a self-diagnosis function for safety such that a high level of safety and reliability is guaranteed. A safety controller is provided with a so-called failsafe function whereby a safety control is forcibly carried out such that its own control will not lead into a dangerous result when an abnormality is detected as a result of its self-diagnosis. Safety terminals are also provided with a self-diagnosis function and a failsafe function whereby a safety control is carried out such that their own control will not lead into a dangerous result when an abnormality is detected as a result of their self-diagnosis. Thus, a safety control system operates, for example, such that the operations of a robot will not lead into a dangerous result.

In the above, "safety" specifically includes regulated safety standards such as IEC 61508 and the EN Standard. IEC 61508 (Functional safety of electrical, electronic and programmable electronic safety-related systems) defines the probability of failure per hour, defining four steps of Safety Integrity Level (SIL) according to this probability. The EN Standard evaluates the safety of machinery, defining five safety categories. Safety controllers, safety IO terminals and safety control systems according to this invention are intended to respond to any of these safety standards. Safety IO terminals are also referred to as safety slaves or safety slave units.

In summary, this invention makes it possible to provide a safety controller which will not make it necessary to increase the cost of wiring or to make the control board larger because of an increase in the number of wires for the power source as the IO unit is miniaturized or the number of point is reduced, such that an IO structure with no waste can be realized regarding the number of control points and such that changes in and additions to the system can be easily effected.

What is claimed is:

1. A safety controller in a building block configuration comprising a single IO unifying unit and an array of a plurality of IO units including IO circuits, said single IO unifying unit being connectable to said IO units;
said IO unifying unit including an IO power-receiving terminal for receiving power from an external IO power source and an IO power distributing terminal for distributing said received power to said array of IO units after passing inside said IO unifying unit;
said array of IO units including distribution mains that extend along said array and have a starting end connected to said IO power distributing terminal and distribution branch lines for supplying power from said distribution mains to each of said IO circuits inside said IO units;
IO power shutoff means being provided to said IO unifying unit on upstream side of said IO power distributing terminal and to each of said distribution branch lines in each of said IO units for supplying power to said IO circuit through said IO unifying unit, said distribution mains and said distribution branch lines selectably in units of said distribution mains and said distribution branch lines.

2. The safety controller of claim 1 wherein said IO unifying unit further includes a voltage monitor that serves to monitor IO power source voltage and to activate the IO power shutoff means on upstream side of said IO power distributing terminal to thereby shut off supply of power to said distribution mains if said monitored IO power source voltage exceeds a specified value.

3. The safety controller of claim 1 wherein said single IO unifying unit and said IO units each include a diagnosing means for carrying out a diagnosis by experimentally switching on and off the IO power shutoff means associated therewith and thereby determining whether said IO power shutoff means functions normally or not, said IO unifying unit and said IO units carrying out the diagnosis at different times.

4. The safety controller of claim 1 wherein the IO power shutoff means provided to said IO unifying unit shuts off supply of power to said IO unifying unit whenever the voltage of IO power supplied thereto becomes outside a specified range, whenever a hardware abnormality is detected by a microprocessor forming an internal circuit of said IO unifying unit, and whenever a watchdog timer of said microprocessor has counted up time.

5. The safety controller of claim 1 wherein the IO power shutoff means provided to each of said IO units shuts off supply of power to said each IO unit whenever the voltage of IO power supplied thereto becomes outside a specified range, whenever voltage of power for an internal circuit of said each IO unit becomes outside a specified range, whenever an abnormal condition has occurred between said IO unifying unit, whenever a hardware abnormality is detected by a microprocessor forming said internal circuit, and whenever a watchdog timer of said microprocessor has counted up time.

6. An IO unit provided to the safety controller of claim 1, said IO unit comprising:

an IO circuit for connection to an external device;

an internal circuit for controlling operations of said IO circuit;

IO circuit line for said IO circuit serving to supply power for the operations of said IO circuit; and internal circuit line for supplying power for operations of said internal circuit;

said IO circuit line and said internal circuit line being mutually insulated from each other, said IO circuit line and said internal circuit line being each separately provided with a power-supplying terminal for supplying power thereto from outside, said internal circuit line being a branch line branching from a distribution line for an internal circuit of an CPU unit of said safety controller.

* * * * *